US006857551B2

(12) United States Patent
Chang

(10) Patent No.: US 6,857,551 B2
(45) Date of Patent: Feb. 22, 2005

(54) AUTO-FEED TERMINAL WIRE CLAMPING MACHINE AND ITS TERMINAL STRUCTURE

(76) Inventor: Min-Chen Chang, P.O. Box 36-80, Dong-Shing Rd., Taichung City (TW)

(*) Notice: Subject to any disclaimer, the term of this patent is extended or adjusted under 35 U.S.C. 154(b) by 80 days.

(21) Appl. No.: 10/420,407

(22) Filed: Apr. 22, 2003

(65) Prior Publication Data

US 2004/0211813 A1 Oct. 28, 2004

(51) Int. Cl.[7] .......... B23K 20/12

(52) U.S. Cl. .......... 228/44.3; 228/6.2; 29/56.6; 29/751; 72/421

(58) Field of Search .......... 228/15.1, 44.3, 228/44.7, 49.5, 115, 6.2; 29/56.6, 749, 751, 753, 860, 861, 862, 863, 854; 72/421, 422; 140/1, 111

(56) References Cited

U.S. PATENT DOCUMENTS 3,571,888 A * 3/1971 Di Filippo .......... 29/751
3,791,008 A * 2/1974 Dyksterhouse .......... 29/56.6
3,978,581 A * 9/1976 Miura .......... 29/858
4,043,032 A * 8/1977 Spangler .......... 29/863
4,191,443 A * 3/1980 Doyle .......... 439/462
4,831,727 A * 5/1989 Johnson et al. .......... 29/866
5,069,640 A * 12/1991 Wasimoto et al. .......... 439/619
5,771,574 A * 6/1998 Kato et al. .......... 29/861
5,890,280 A * 4/1999 Matsuzawa .......... 29/753
6,068,527 A * 5/2000 Ohsumi et al. .......... 439/877
6,260,262 B1 * 7/2001 Torii .......... 29/753

* cited by examiner

*Primary Examiner*—Jonathan Johnson
(74) *Attorney, Agent, or Firm*—Charles E. Baxley

(57) ABSTRACT

An auto-feed terminal wire clamping machine and its terminal structure. This invention can automatically sieve and randomly arrange the disordered terminal inner molds and feed them in an ordered direction to the feeding groove of such terminal wire clamper and automatically complete the terminal wire clamping operation.

15 Claims, 11 Drawing Sheets

AUTO-FEED TERMINAL WIRE CLAMPING MACHINE AND ITS TERMINAL STRUCTURE

BACKGROUND OF THE INVENTION

1. Field of the Invention

The present invention relates to an inner mold terminal of a wire clamping machine, more particularly to a terminal structure used in a terminal wire clamping machine with an auto aligning feeder; such auto aligning feeder is used to arrange and align the disordered terminal inner molds automatically and feed them into a terminal wire clamper for the automatic terminal wire clamping operation.

2. Description of the Related Art

The method of manufacturing electric wire connectors regardless of the two-pin or three pin ones includes the steps of fixing the electric wire with the metallic insert pin of the connector, and then putting them into a mold for filling and fixing with plastic materials in order to wrap and fix the electric wire and the metal insert pin. However, such method usually causes defects to the finished goods and gives a high failure rate due to the wrong positioning of the wire and metallic insert pin by the operator. Therefore, manufacturers have developed an inner mold terminal as shown in FIG. 1, and such terminal inner mode has a through hole with appropriate size and position, so that the operator can connect the connecting end of the electric wire and the metallic insert pin first before inserting and fixing the metallic insert pin to the terminal inner mold. By such terminal inner mold, the metallic insert pin and the electric wire can be correctly positioned when the electric wire connector is molded, and such arrangement no longer causes defects to the finished goods due to the crooked positioning of pins.

However, the manufacturing procedure of such method by manually fixing the electric wire with the metallic insert pin and then manually inserting the metallic insert pin into the through hole of the inner mold terminal totally relies on the manual operations, and requires the clipping actions for three times to complete the connection of a set of metallic insert pin and the electric wire. Such clipping action cannot be completed in one time, not only wasting time, but also requiring a great deal of manpower, which causes limitations to the production output and makes the mass production difficult or even impossible.

SUMMARY OF THE INVENTION

The primary objective of the present invention is to provide a way of automatically completing the action of arranging the terminal inner molds in order, feeding, punching, and clamping automatically, not only can connect the whole set of metallic insert pins with the electric wire, but also can use the automated machine to replace labor forces and reduce costs.

To achieve the above objectives, the technical measure taken according to this invention comprises:

- a terminal wire clamper having a feeding groove, and the feeding groove at its rear end having a feeding push rod and at its front end having a terminal mold plate module that further comprising an upper mold plate and a lower mold plate, and the upper mold plate being disposed at the corresponding position above the lower mold and coupling to a pressurized motion device;
- an aligning conveyer comprising an aligning groove for accommodating and storing the terminal inner groove, an opening at one end of the aligning conveyer being coupled to the side of the feeding groove; and a vibratory conveying motor disposed under the aligning feeder;
- an auto aligning feeder having a vibratory disc on a machine table, and such vibratory disc having a spiral track that includes a positive and inverse alignment area, an angle alignment area, and an open position alignment area; wherein the spiral track is coupled to an opening at another end of the aligning groove;
- a plurality of terminal inner molds, each having a ground terminal and two connecting terminals aligned in order and disposed on an inner mold stand, wherein the connecting terminal at its end having an outwardly bent wire clamping section such that the center of the wire clamping section shifting towards the outer side of the inner mold.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
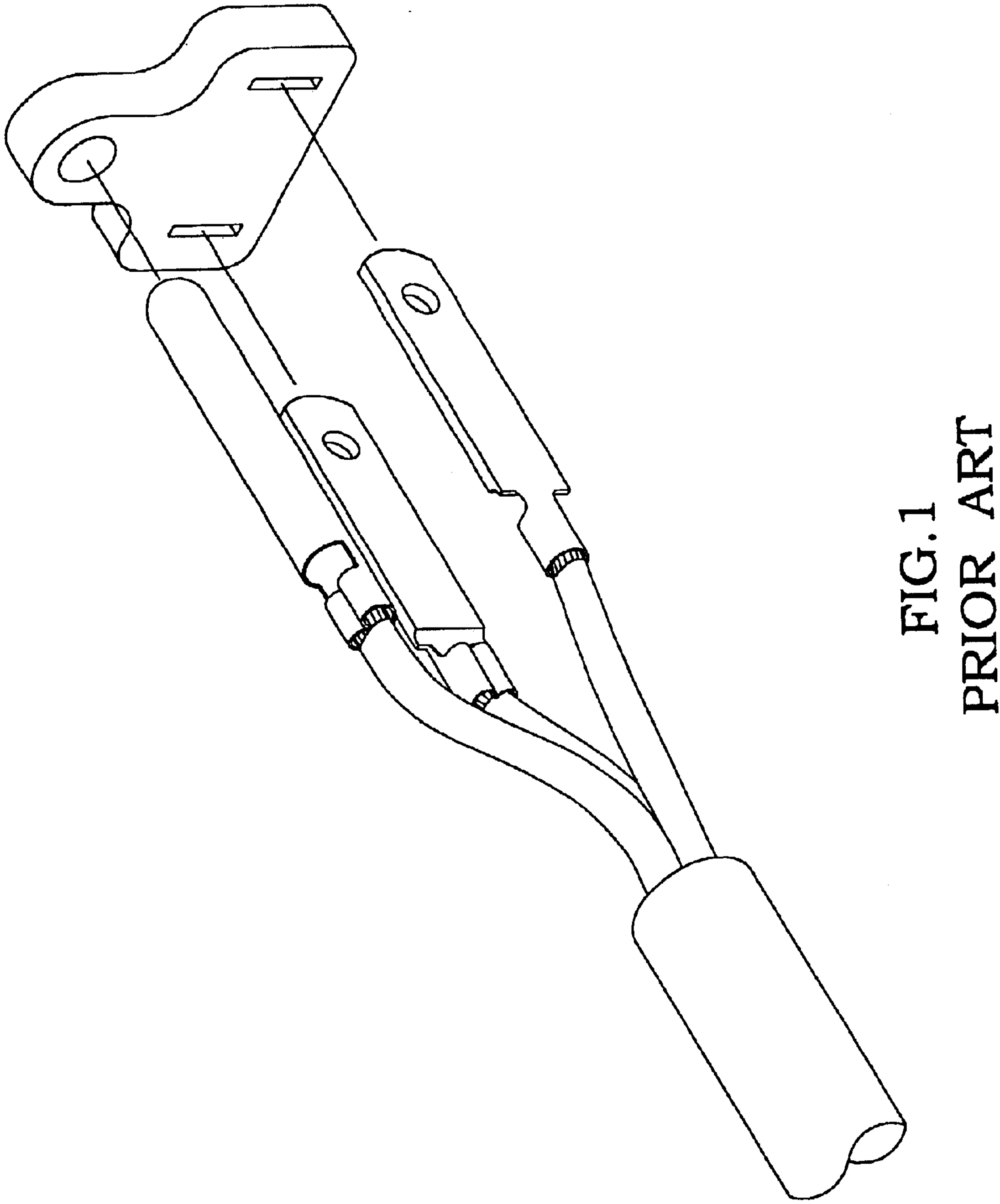
FIG. 1 PRIOR ART
FIG. 1 is an illustrative diagram of the assembled inner mold terminal according to the prior art.
Figure 2:
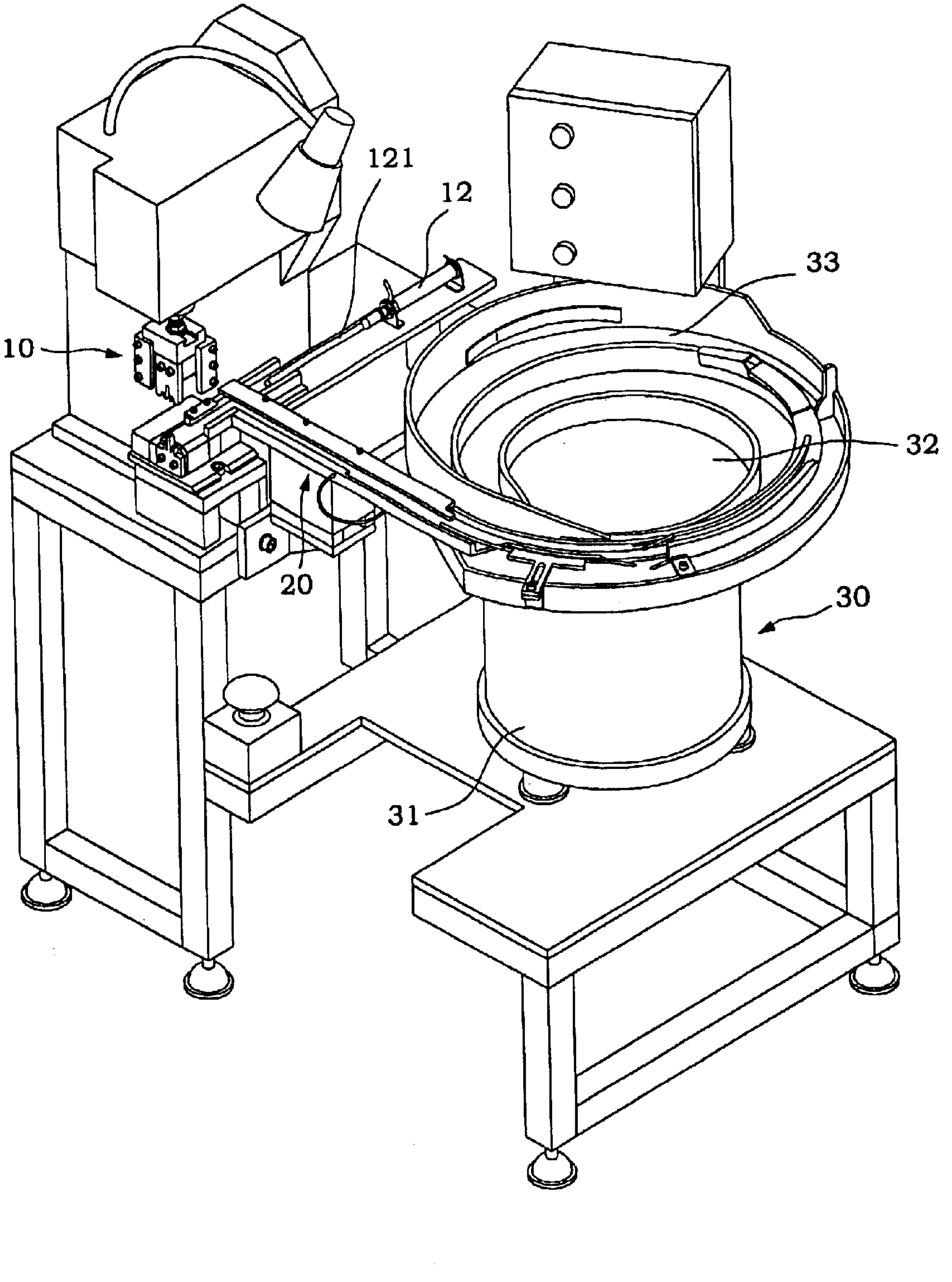
FIG. 2 is a perspective diagram of the present invention.
Figure 3:
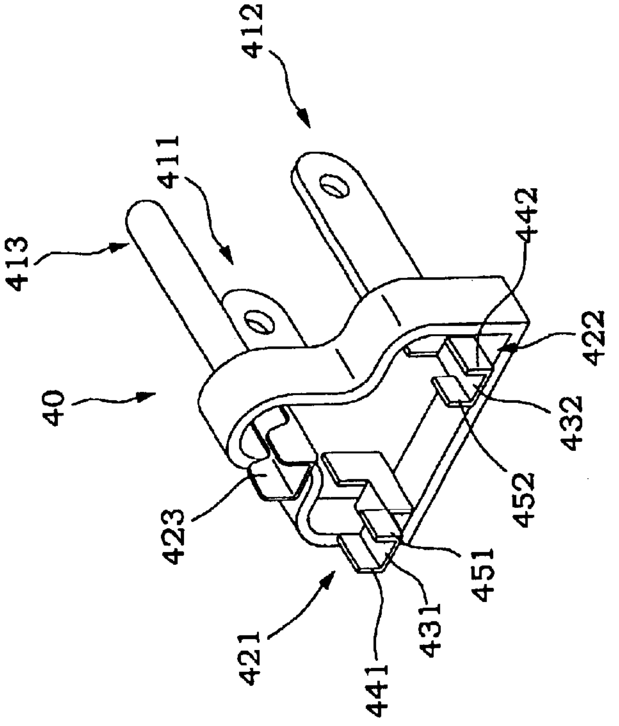
FIG. 3 is a perspective diagram of the inner mold terminal to according to the present invention.

An auto-feed terminal wire clamping machine and its terminal structure comprises:

A plurality of inner molds 40 as shown in FIG. 3 being an inner mold stand substantially triangular in shape, having two sheet connecting terminals 411, 412 disposed thereon, and the connecting terminal 411, 412 at the end having a wire connecting section 421, 422, wherein the wire connecting section 421, 422 being bent outward to form a bottom edge 431, 432, and the outer side of the bottom edge 431, 432 being bent into an external sidewall 441, 442 with a right angle, and the inner edge of the bottom edge 431, 432 being bent downward to form an internal sidewall 451, 452, wherein the external sidewall 441, 442 and the internal sidewall 451, 452 being equal in length; a cylindrical connecting terminal 413 and the rear end of the connecting terminal 413 being bent and folded to form a clamping end with an opening upward;

A terminal wire clamper 10, as shown in FIG. 2, comprising a feeding groove 11 disposed on a motive force machine table, and the rear end of the feeding groove 11 having an feeder 12 driven by an oil-pressure cylinder or air-pressure cylinder, and the front end of the feeder 12 being coupled to a feeding push rod 121 and sliding within the feeding groove 11; a feeding sensing device 111 disposed on the internal sidewall of the feeding groove 11 for detecting if there is an inner mold terminal 40 in the feeding groove 11; further the feeding groove 11 at its front end having a terminal mold plate module 13 which comprises an upper mold plate 131 and a lower mold plate 132 of corresponding shapes; wherein a pressurized motion device 14 disposed above the motive force machine table, and the upper mold plate 131 being secured to the bottom end of said pressurized motion device 14, and the lower mold plate 132 being secured to the front end of the feeding groove 12, and vertically corresponsive to the position directly under the upper mold plate 131 so that the pressurized motion device 14 producing a vertically down movement by the driving motive force, and brining the upper mold plate 131 to punch downward and engaging with the lower mold plate 132;

An aligning conveyer 20, having an aligning groove 21, and the aligning groove 21 being a storage space for accommodating and storing the inner mold terminal 40, and an opening at one end of the aligning groove 21 being coupled to an edge of the feeding groove 11, and a vibratory conveying motor 22 being disposed under the aligning conveyer 20; by means of the vibration produced by the vibratory conveying motor, the terminal inner molds 40 in the aligning groove 21 being pushed forward into the feeding groove 11; wherein a motion detector 211 being disposed on the sidewall of the aligning groove 21;

An auto aligning feeder 30, having a vibratory disc 32 on a machine table 31 for placing a plurality of terminal inner molds 40, and the vibratory disc 32 having an inwardly aslant spiral track 33, and the spiral track have a clockwise and counterclockwise aligning area 34, an angle aligning area, 35 and an open positioning area 36; a fixed direction arc plate 341 being secured on the clockwise and counterclockwise aligning area 34 on the spiral track 33 to define a clipping space 342; a stirring rod 361 in the same direction and a latch stirring rod 362 being disposed at the open positioning area 36; a latch flange 363 being disposed on and protruded from the spiral track 33; wherein the spiral track 33 being coupled to the opening at another end of the aligning groove 21, and an opening disposed near the external edge of each aligning area for receiving the eliminated terminal inner molds 40 that falls into the lower layer of the spiral track 33 for sieving again; users may pour large quantity of terminal inner molds into the vibratory disc 32; by the vibration of the vibratory disc 32, the terminal inner molds 40 gradually spreading out and moving up along the spiral track 33.

Figure 5:
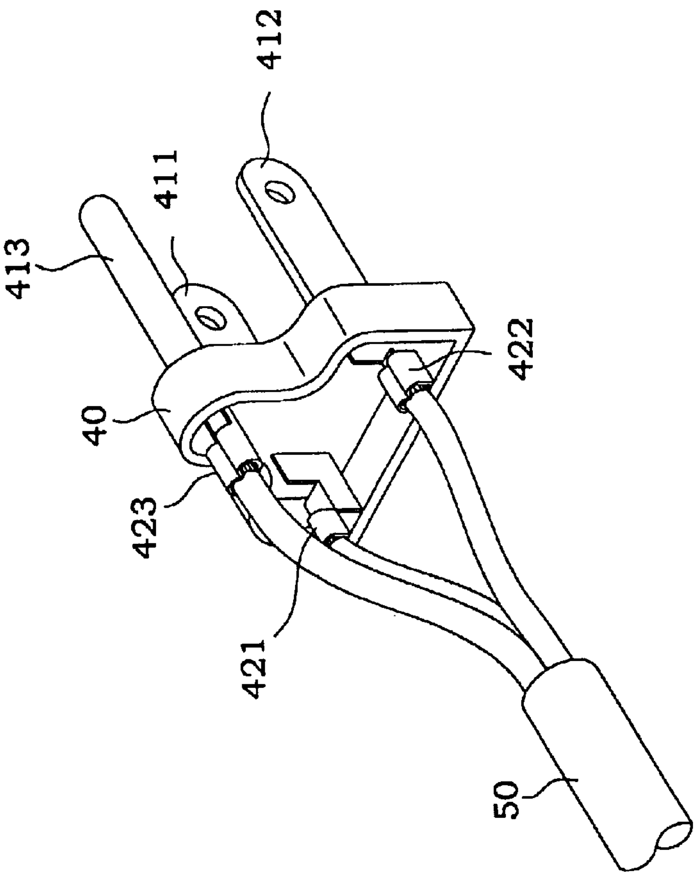
FIG. 5 is a perspective diagram of the finished goods of the inner mold terminal according to the present invention.
Figure 4A:
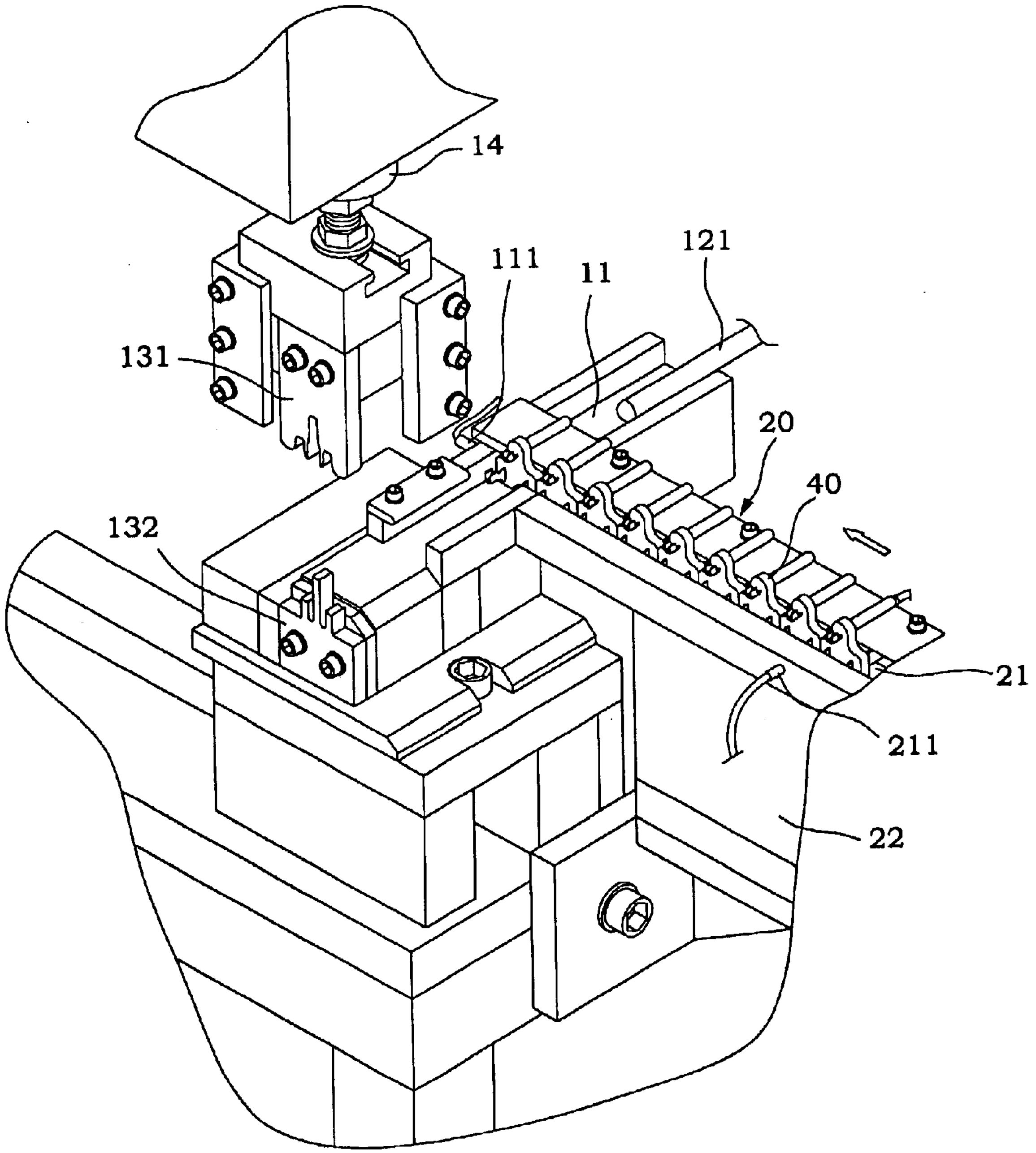
FIG. 4A is an illustrative diagram of the motion of the terminal wire clamper according to the present invention.
Figure 4B:
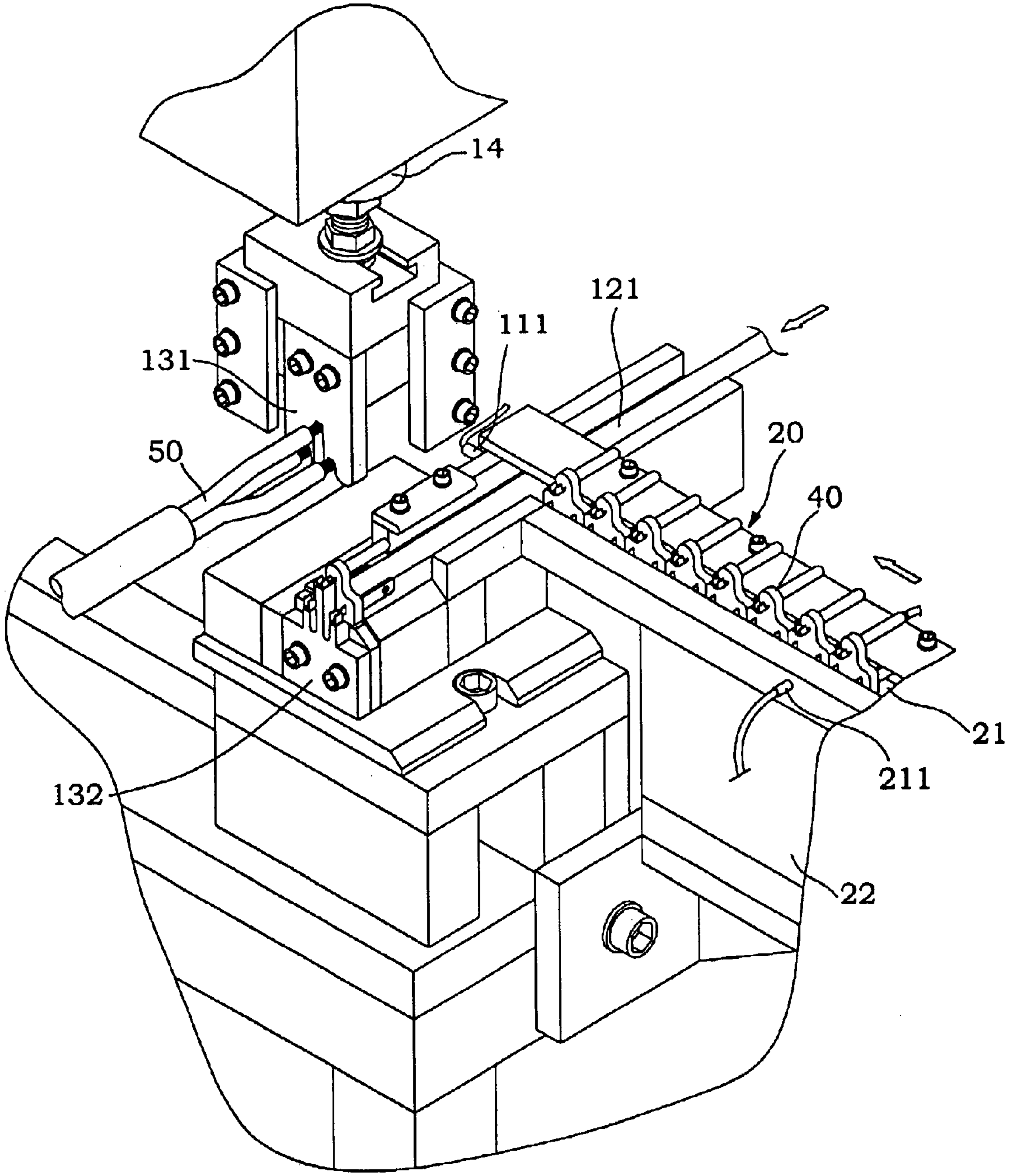
FIG. 4B is another illustrative diagram of the motion of the terminal wire clamper according to the present invention.
Figure 4C:
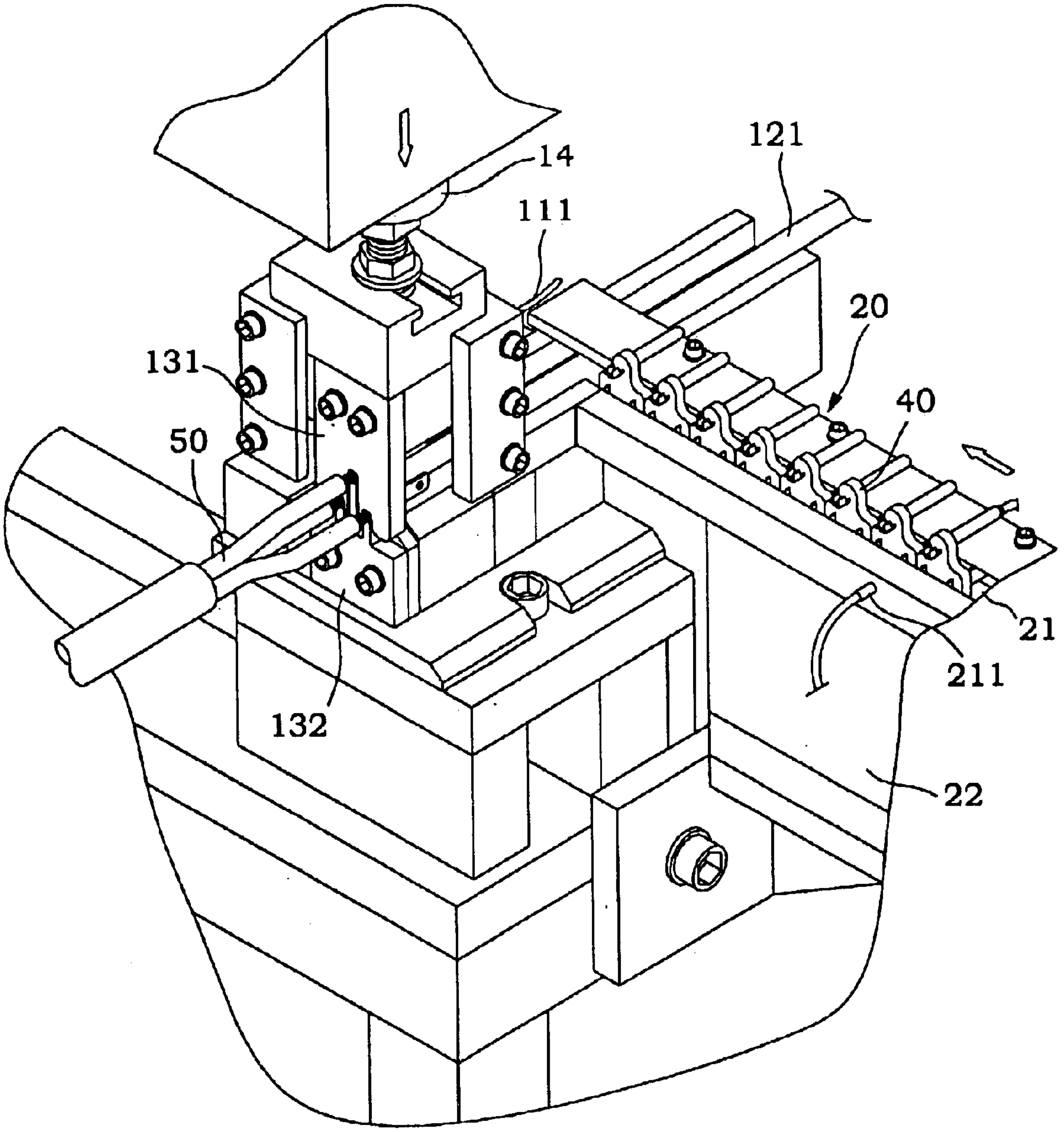
FIG. 4C is another further illustrative diagram of the motion of the terminal wire clamper according to the present invention.

Please refer to FIGS. 4A to 4C. When the aligning conveyer 20 pushes and conveys the terminal inner molds 40 in the aligning groove 21 into the feeding groove 11, the feeding sensor 111 will immediately start feeding device 12. The feeding push rod 121 is used to push the terminal inner molds 40 in the feeding groove 11 to the lower mold plate 132, and attach the wire connecting section 421, 422 and the clamping end 423 of the inner mold terminal 40 closely to the lower mold plate 132 (as shown in FIG. 4B). Then, the operator can put the end of an electric wire 50 directly in each wire connecting section 421, 422 and the clamping end 423 or in the recession on the upper mold plate 131. Then, the pressurized motion device 14 is started to drive the upper mold plate 131 and the electric wire 50 to press down. When the upper mold plate 131 and the lower mold plate 132 are engaged and pressed tightly, the wire connecting section 421, 422, clamping end 423, and electric wire 50 are pressed simultaneously for the connection (as shown in FIG. 4C). When the upper mold plate 131 returns to its original position, the finished goods (as shown in FIG. 5) can be taken out, and returns the feeding push rod 121 to the original position for repeating the previous motions; further, when the terminal inner molds 40 in the aligning conveyer 20 is reduced to a certain level (less than the predetermined safety storage), the motion detector 211 will drive the auto aligning feeder 30 to start operating and sieve and convey the inner mold terminal 40 from the vibratory disc 32 into the aligning conveyer 20. If the storage of the terminal inner molds 40 in the aligning conveyer is full, the power of the auto aligning feeder 30 will be disconnected automatically in order to control the quantity of terminal inner molds 40 for the manufacturing, and save the power consumption.

Figure 6:
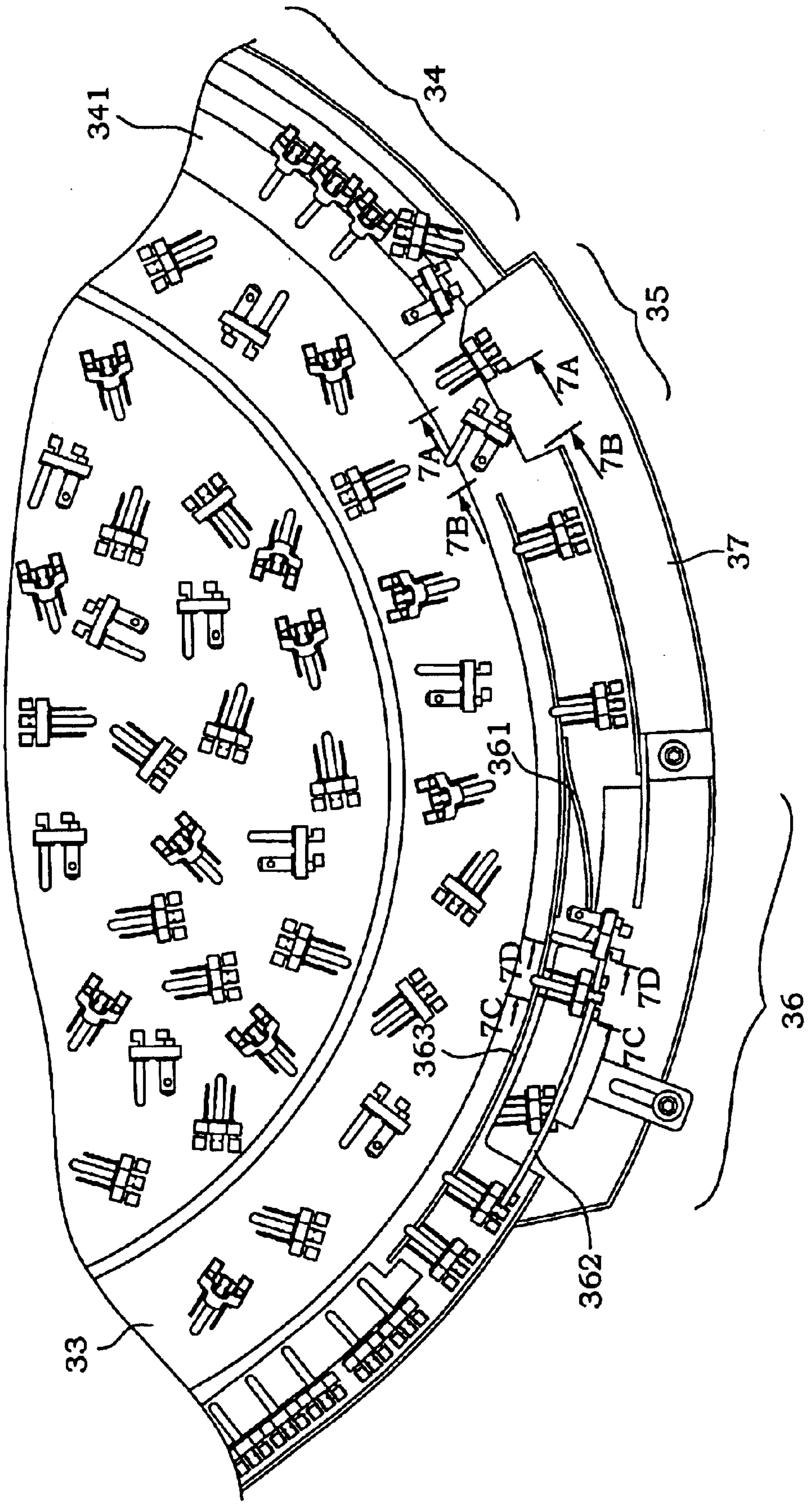
FIG. 6 is an illustrative diagram of the planar motion of the auto aligning feeder according to the present invention.
Figure 7A:
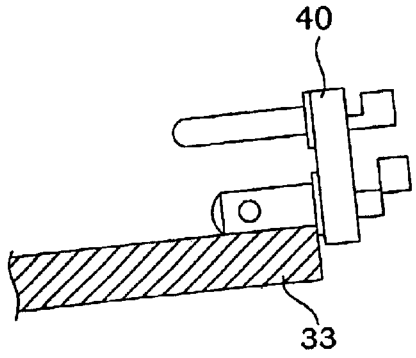
FIG. 7A is a cross-sectional diagram of the line 7A—7A as depicted in FIG. 6.
Figure 7B:
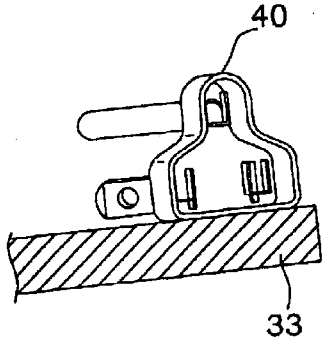
FIG. 7B is a cross-sectional diagram of the line 7B—7B as depicted in FIG. 6.

Please refer to FIG. 6. The theory for the auto aligning feeder 30 to adjust and align the terminal inner molds 40 is described in detail as follows:

When the inner mold terminal 40 enters into the clockwise and counterclockwise aligning area 34, the fixed direction arc plate 341 in a clipping space 342 can fix the connecting terminal 411, 412 and the ground terminal 413 of the inner mold terminal 40 in the positive direction; on the contrary, since the direction is opposite or other disorderly compiled terminal inner molds 40 cannot be fixed in the clipping space 342, the terminal inner molds 40 will fall down from the open groove 37. Further, as shown in FIG. 7A, when the inner mold terminal 40 enters into the angle aligning area 35, the flange of the inner mold terminal 40 will latch to the edge of the spiral track 34; if there is a deviation to the angle of the inner mold terminal (as shown in FIG. 7B), the flange of the inner mold terminal 40 is unable to latch to the edge of the spiral track 34. When the vibratory disc 33 vibrates, the deviated inner mold terminal 40 will slide down along the slope of the spiral track 34 into next layer of the spiral track 34 for another sieve.

Figure 7C:
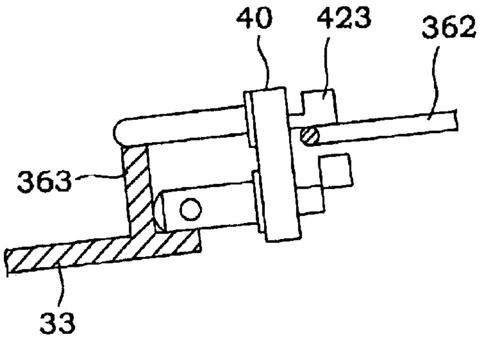
FIG. 7C is a cross-sectional diagram of the line 7C—7C as depicted in FIG. 6.
Figure 7D:
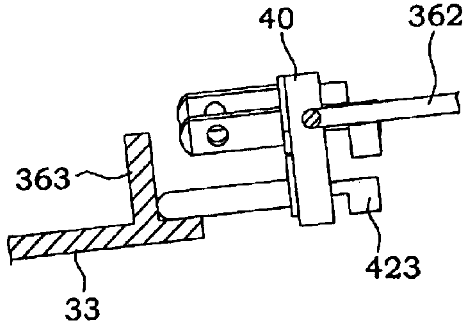
FIG. 7D is a cross-sectional diagram of the line 7D—7D as depicted in FIG. 6.

When the inner mold terminal 40 enters into the open positioning area 36, the stirring rod 361 in the same direction can adjust the position of each inner mold terminal 40 such that the inner side of the inner mold terminal 40 aligned with the stirring rod 361 in the same direction. Please refer to FIG. 7C. Since the connecting terminal 411, 412 of the inner mold terminal 40 is shorter than the ground terminal 413, when the metallic insert pin of the connecting terminal 411, 412 presses against the latch flange 363, the ground terminal 413 protrudes from the top of the latch flange 363 so that the inner mold terminal 40 can exactly pass through the latch stirring rod 362. If the inner mold terminal 40 rotates in an improper direction, the ground terminal 413 will press against the latch flange 363 and cause the inner mold terminal to protrude from the latch stirring rod 362 and fall into the open groove 37.

By means of the action of the foregoing aligning area in a clockwise and counterclockwise aligning area 34, angle aligning area 35, and open positioning area 36, the sieved inner mold terminal can be arranged neatly and sent into the feeding groove 11 of the terminal clamping device 10 in a fixed direction, so that the terminal clamping device 10 will automatically complete the clamping of the terminal.

Figure 8:
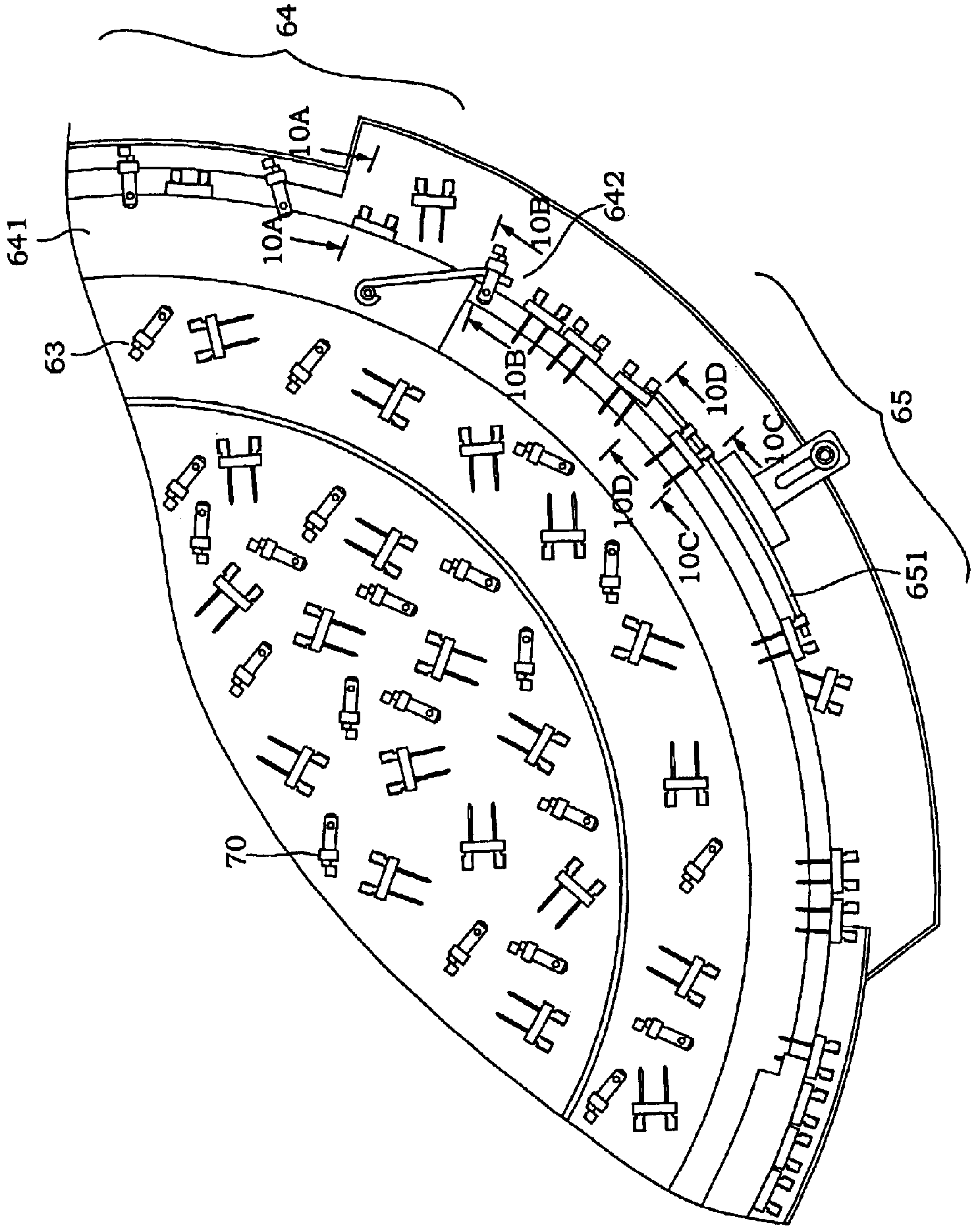
FIG. 8 is an illustrative diagram of the planar motion of the auto aligning feeder according to a second preferred embodiment of the present invention.
Figure 9B:
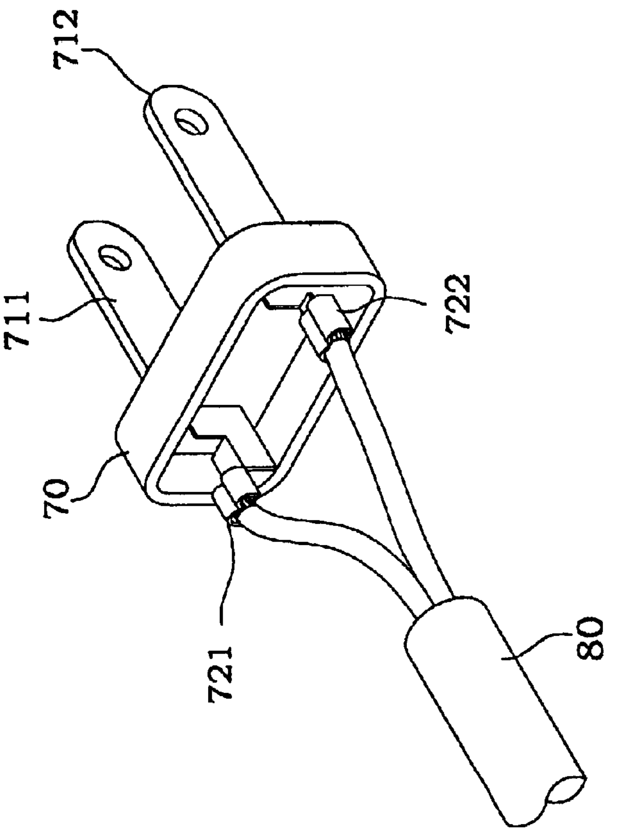
FIG. 9B is a perspective diagram of the finished goods of the inner mold terminal according to a second preferred embodiment of the present invention.
Figure 9A:
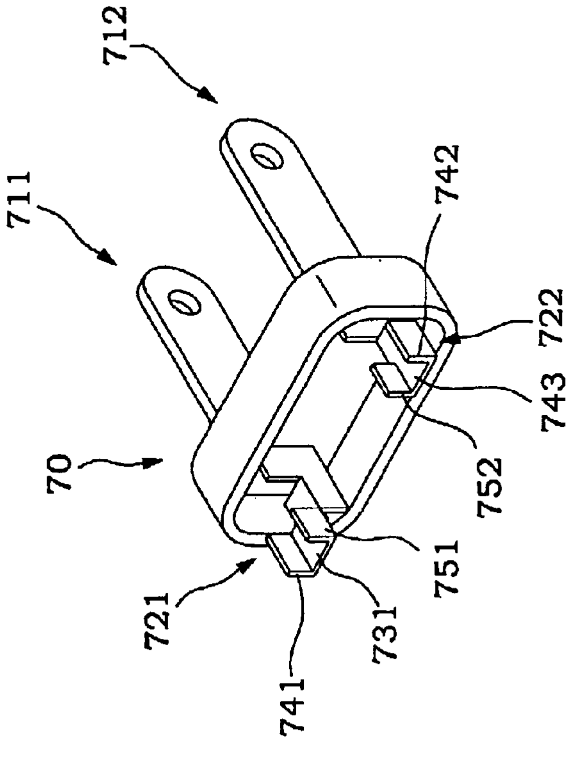
FIG. 9A is a perspective diagram of the inner mold terminal according to a second preferred embodiment of the present invention.

Please refer to FIGS. 8 to 10 for the second preferred embodiment of the present invention, which can also be applied in the 2-pin terminal without a grounding terminal. Except the sieving method of the auto aligning feeder 30 is different and it requires to change to the terminal plate module 13 of the corresponding shape, the rest is the same as that described above, and thus will not be described here.

In FIG. 9, a plurality of inner mold terminals 70, each being an inner mold stand in the shape of rectangular blocks and having two plate connecting terminals 711, 712, and a wire connecting section 721, 722 at the end of the inner mold terminal 70. The outer sides of the wire connecting section 721, 722 are bent and folded into a bottom edge 731, 732, and the outer end of such bottom edge 731, 732 is bent upward into a right angle to form an outer sidewall 741, 742, and the inner edge of the bottom edge 731, 732 is bent downward and then upward to form an inner sidewall 751, 752, wherein the outer sidewall 741, 742 and the inner sidewall 751, 752 are equal in height; and the wire connecting section 721, 722 is for passing and fixing one end of an electric wire 80.

In FIG. 8, the auto aligning feeder 60 has a vibratory disc 62; the vibratory disc 62 has a spiral track 63; the spiral track has a clockwise and counterclockwise aligning area 64 and an open positioning aligning area 65; such clockwise and counterclockwise aligning area 64 has a fixed direction arc plate 641 secured on the spiral track 63 to define a clipping space; the fixed direction arc plate 641 has a fixed stirring rod 642, and such fixed direction stirring rod 642 has a height slightly higher than that of the lying inner mold terminal 70; such open positioning aligning area 65 has a latch stirring rod 651; wherein the side of the vibratory disc 62 adjacent to each aligning area has an open groove 66 for eliminating some inner mold terminals 40 and allowing them to fall to the next layer of the spiral track 63 for sieving again.

Figure 10A:
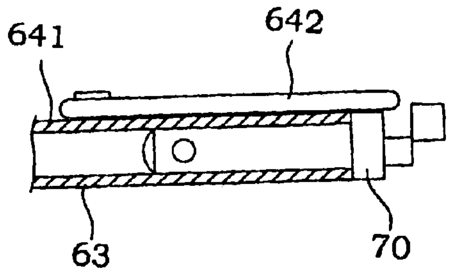
FIG. 10A is a cross-sectional diagram of the line 9A—9A as depicted in FIG. 8.
Figure 10B:
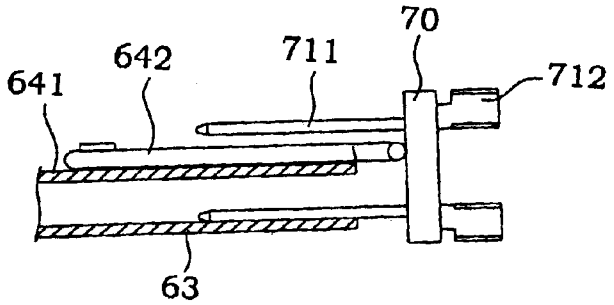
FIG. 10B is a cross-sectional diagram of the line 9B—9B as depicted in FIG. 8.

When the inner mold terminal 70 enters into the clockwise and counterclockwise aligning area 64, the clipping space of the fixed direction arc plate 641 can fix the connecting terminal 711, 712 of the inner mold terminal 70 in the positive direction. On the contrary, since the connecting terminal 711, 712 of the inner mold terminal 70 in the reverse direction or disorderly piled cannot be fixed in the clipping space, and will fall off from the open groove 66. Further, in FIG. 10A, the fixed stirring rod 642 has a height slightly higher than that of the lying inner mold terminal 70, therefore, the inner mold terminals 70 can pass through the fixed stirring rod 642, but the vertical inner mold terminal 70 as shown in FIG. 10B has a height higher than that of the fixed stirring rod 642, therefore the inner mold terminals 70 will be stirred out by the fixed stirring rod when they pass through the fixed stirring rod 642.

Figure 10C:
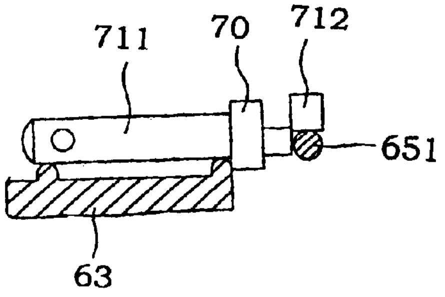
FIG. 10C is a cross-sectional diagram of the line 9C—9C as depicted in FIG. 8.
Figure 10D:
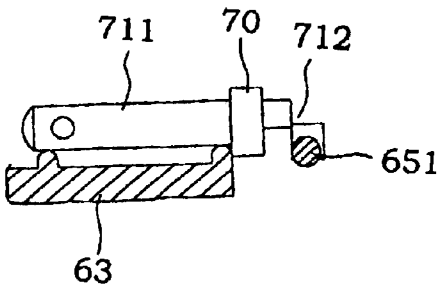
FIG. 10D is a cross-sectional diagram of the line 9D—9D as depicted in FIG. 8.

Further, please refer to FIG. 10C. Since the clipping end 712 of the inner mold terminal 70 is biased, and when the opening of the wire connecting section 721, 722 faces upward, the height of the clipping end 712 can pass through the latch stirring rod 6651. When the opening of the wire connecting section 721, 722 faces downward and the inner mold terminal 70 tries to pass through the latch stirring rod 651, the inner mold terminal will be stirred out by the latch stirring rod 651.

By the motion described above, the present invention not only can be applied to the inner mold terminal 40 with 3 pins, but also can be applied to the inner mold terminal 70 with two pins. Further, the present invention can be applied to the inner mold stands of other different kinds of connectors by adjusting the aligning device.

While the present invention has been described in connection with what is considered the most practical and preferred embodiment, it is understood that the invention is not limited to the disclosed embodiments but is intended to cover various arrangements included within the spirit and scope of the broadest interpretation and equivalent arrangements.

What is claimed is:

1. An auto-feed terminal wire clamping machine and its terminal structure, comprising: a terminal clamping device, having a feeding groove, a feeding push rod disposed at the rear end of said feeding groove, terminal mold plate module disposed at the front end of said feeding groove, wherein said terminal mold module further comprising an upper mold plate and a lower mold plate, said lower mold plate being secured to the front of said feeding groove, and said upper mold plate being disposed correspondingly above said lower mold plate, and coupling to a pressurized motion device;

an aligning conveyor, having an aligning groove for accommodating and storing a plurality of inner mold terminals, and an opening of the aligning groove being coupled to one side of said feeding groove, and a vibratory conveying motor being disposed under said aligning conveyor;

an auto aligning feeder, having a vibratory disc disposed on a machine table, and said vibratory disc having a spiral track, and said spiral track having a clockwise and counterclockwise aligning area, and an open positioning aligning area; wherein said spiral track being coupled to an opening at another end of said aligning groove;

said plurality of inner mold terminals, each having a ground terminal and two connecting terminals passing through in sequence, wherein the end of said inner mold terminals being bent outward to define a wire clamping section such that the center of said wire clamping section shifts towards the outer side of said inner mold terminals; and by the foregoing structure, the disorderly arranged inner mold terminals being sieved randomly and arranged neatly and sent into the feeding groove of said terminal clamping device in a fixed direction to complete the clamping of the terminal.

2. The auto-feed terminal wire clamping machine and its terminal structure of claim 1, wherein said feeding push rod is driven by one selected from the collection of an air-pressure cylinder and an oil-pressure cylinder.

3. The auto-feed terminal wire clamping machine and its terminal structure of claim 1, wherein said feeding groove has a feeding sensor.

4. The auto-feed terminal wire clamping machine and its terminal structure of claim 1, wherein said aligning conveyor has a motion sensor.

5. The auto-feed terminal wire clamping machine and its terminal structure of claim 1, wherein said clockwise and counterclockwise aligning area further comprises a fixed direction arc plate being secured on said spiral track to define a clipping space.

6. The auto-feed terminal wire clamping machine and its terminal structure of claim 1, wherein said open positioning aligning area has a stirring rod in the same direction and a latch stirring rod, and a latch flange protruded from said spiral track.

7. The auto-feed terminal wire clamping machine and its terminal structure of claim 1, wherein said wire clamping section of said connecting terminal with its outer side bent and folded into a bottom edge, and said bottom edge having both sides bent upward to define an outer sidewall and an inner sidewall.

8. An auto-feed terminal wire clamping machine and its terminal structure, comprising:

a terminal clamping device, having a feeding groove, and said feeding groove having a feeding push rod at its rear end, and a terminal mold plate module at its front end; wherein said terminal mold plate further comprising an upper mold plate and a lower mold plate, and said lower mold plate being secured to the front end of said feeding groove, and said upper mold plate being correspondingly disposed above said lower mold plate and coupling to a pressurized motion device;

an aligning conveyor, having an aligning groove for accommodating and storing a plurality of inner mold terminals, and an opening at one end of said aligning groove being coupled to a side of said feeding groove, and a vibratory conveying motor being disposed under said aligning conveyor;

an auto aligning feeder, having a vibratory disc disposed on a machine table, and said vibratory disc having a spiral track, and said spiral track having a clockwise and counterclockwise aligning area and an open positioning aligning area; wherein said spiral track being coupled to an opening at another end of said aligning groove;

said plurality of inner mold terminals, each having two connecting terminals on an inner mold terminal, wherein the end of said connecting terminals being bent outward to define a wire clamping section such that the center of said wire clamping section shifts towards the outer side of said inner mold terminal;

by the foregoing structure, the disorderly arranged inner mold terminals being sieved randomly and arranged neatly and sent into the feeding groove of said terminal clamping device in a fixed direction to complete the clamping of the terminal.

9. The auto-feed terminal wire clamping machine and its terminal structure of claim 8, wherein said feeding push rod is driven by one selected from the collection of an air-pressure cylinder and an oil-pressure cylinder.

10. The auto-feed terminal wire clamping machine and its terminal structure of claim 8, wherein said feeding groove has a feeding sensor.

11. The auto-feed terminal wire clamping machine and its terminal structure of claim 8, wherein said aligning conveyor has a motion sensor.

12. The auto-feed terminal wire clamping machine and its terminal structure of claim 8, wherein said clockwise and counterclockwise aligning area further comprises a fixed direction arc plate being secured on said spiral track to define a clipping space.

13. The auto-feed terminal wire clamping machine and its terminal structure of claim 8, wherein said fixed direction arc plate has a stirring rod.

14. The auto-feed terminal wire clamping machine and its terminal structure of claim 8, wherein said open positioning aligning area has a latch stirring rod.

15. The auto-feed terminal wire clamping machine and its terminal structure of claim 8, wherein said wire clamping section of the connecting terminal with its outer side being bent and folded toward the outer side of the inner mold stand to form a bottom edge, and said bottom edge having both sides bent upward to define an outer sidewall and an inner sidewall.

* * * * *